Patented July 30, 1929.

1,722,297

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CATALYTIC OXIDATION OF ORGANIC COMPOUNDS.

No Drawing.      Application filed August 26, 1927. Serial No. 215,759.

This invention relates to processes of oxidizing organic compounds, particularly in the vapor phase.

According to the present invention, organic compounds are oxidized, particularly in the vapor phase, in the presence of catalysts or contact masses containing, when freshly prepared, zeolites which are the reaction products of at least three different classes of components and which in the specification and claims will be referred to as "multi-component zeolites". Some of the zeolites which are used in the new catalysts have been described and claimed as products in my co-pending application, Serial No. 142,783, filed October 19, 1926, of which the present application is in part a continuation.

Zeolite forming components may be divided into three classes:—silicates with or without partial substitution of other suitable acidic oxides; metallates, such as alkali metal metallates; and salts of metals which are sufficiently amphoteric to form base exchange bodies when caused to react with silicates and metallates under conditions suitable for the production of zeolites. The ordinary zeolites of commerce are prepared by the reaction of a soluble silicate, either with alkali metal metallates or with metal salts. The catalysts of the present invention, on the other hand, are reaction products of a silicate with at least one metallate and at least one metal salt. The present invention is directed to processes of oxidizing organic compounds in the presence of such multi-component zeolites and their derivatives, in which at least one catalytically active element or radical is chemically combined with or in the zeolite. Both diluted and undiluted multi-component zeolite catalysts can be used in the present invention, but in many cases the use of diluted multi-component zeolites is preferable. In the diluted zeolite contact masses used in the present invention, the catalytic power may reside wholly in the zeolite or in chemical combination therewith, or it may reside partly in the zeolite and partly in diluents combined therewith to form mixtures or preferably physically homogeneous structures. In some cases catalytically active diluents may be associated with catalytically ineffective multi-component zeolites, and such processes are included within the scope of the present invention.

All of the base exchange bodies used in the present invention, both diluted and undiluted, possess a remarkably porous, honeycomb-like structure, and are in many cases opalescent. When suitable catalytically active components are present, they form catalysts or contact masses of remarkable efficiency, due probably in part at least to the extraordinarily high surface energy of the microscopically porous structures, and probably also to the presence of unsaturated valences in many cases and a asymmetry of the moleclues. It is of course possible that the catalytic activity of the contact masses used in the present invention is due partly or wholly also to other reasons, and the present invention is therefore not intended in any sense to be limited to any theory of action of the products. The molecular complexes which are present in the products used in the present invention are apparently of great size and complexity, and the exact chemical constitution has not been determined, nor has it been determined definitely whether in all cases single chemical compounds are formed, and it is possible that in some cases at least molecular mixtures or solid solutions may be present. The products used possess a physically microscopical homogeneity, and behave in many ways as if they were single compounds, or in the case of diluted zeolites, the zeolite skeleton behaves as if it were a single compound, and I am of the opinion that probably in many cases at least the zeolites are actually in fact single compounds of high molecular weight.

It should be understood that the products used in the present invention are chemically quite distinct from zeolites formed by the reaction of a silicate with either metallates or with metal salts, the so-called two-component zeolites.

The products used in the present invention fall into three main types, depending on the relative proportions of the three classes of components:—If the silicate and metallate components predominate over the metal salt components the resulting products resemble the alumino-silicate type of zeolites; if the metal salt and silicate components predominate over the metallate component the resulting products have certain resemblances to the aluminum-double silicate type of zeolites; where the metallate and metal salt components predominate over the silicate components the products resemble the non-silicious base exchange bodies described in my Patent No. 1,694,620, dated December 11, 1928. It should be understood of course that there are no sharp lines dividing the different types, and one type shades over into the other, as the relative proportions of the components are varied. I have found that all three types of zeolites when prepared with suitable catalytically active components, or associated with suitable catalytically active diluents, and particularly when containing elements of the 5th and 6th groups of the periodic system, especially vanadium, form very effective catalysts for the oxidation of many organic compounds.

The fact that the zeolites used in the present invention are the reaction products of silicates with both metallates and metal salts makes it readily possible to introduce catalytically active components of the most varying types, and the introduction of catalytically active components of different types is readily facilitated, since some catalytically active elements or some valences of such elements form metal salts but do not form metallates, or vice versa. All such catalytically active components can of course be readily introduced into zeolites used in the present invention, and this constitutes an important advantage. Another important advantage of the invention lies in the fact that apparently owing to the great molecular weight of the zeolites used the proportions of the components entering into the zeolite can be varied practically at will, and exact combining proportions of the various elements are not encountered as in the case of simple chemical compounds of relatively lower molecular weight.

The zeolites of the present invention can be prepared under reaction conditions suitable for the formation of base exchange bodies; that is to say, in reaction mixtures which are finally alkaline to litmus. The best base exchanging power is obtained when the products are prepared in solutions which are neutral or preferably alkaline to phenolphthalein, but products of lower base exchanging powers which for catalytic oxidations are frequently of equal efficiency can be produced under reaction conditions ranging from phenolphthalein red to litmus blue as indicator turning points. It is not possible to determine whether zeolites formed under such conditions are homogeneous chemical compounds; it may be that in such cases a mixture of zeolites and non-base exchanging polysilicates are produced. The physical structure, however, remains similar and for catalytic purposes the products are equivalent to zeolites produced under conditions which result in greater base exchanging powers. It should be understood, however, that the word "zeolite" as used in the present application is limited to polysilicates which have at least some base exchanging power when freshly prepared.

Products used in the present invention may be prepared in many ways:—I have found that usually it is desirable to add the metal salt to the metallate and silicate so that at all times the alkali of the latter components is present in excess, and accordingly the reaction automatically at all times remains alkaline to litmus. While, however, this preferred method presents numerous advantages in most cases and results in the production of excellent products with a minimum of supervision, other methods of reaction can be used, and are included in the invention.

Certain of the catalysts used in the present invention may be prepared by adding the silicate or metallate components, or both, to the metal salt components, care being taken that after the reaction is completed the reaction mixture is alkaline to litmus, and preferably neutral or alkaline to phenolphthalein. It is probable that during the reaction at first ordinary silicates are formed, which are later transformed more or less completely into base exchanging bodies. The base exchanging power of such products is lower than that of products which are prepared by adding the metal salt components to the other two components. So that the reaction continuously remains alkaline, but many effective catalysts can be produced by the other method, and are therefore included in the scope of the present invention.

The number of elements which may be included in the products used in the present invention is very large. Thus for example, any of the metal elements which are capable of forming soluble alkali metal metallates may be used, and similarly complex compounds of metals, which metals possess a more or less amphoteric property may be used, and for some purposes are of great importance, as they permit the production of soluble metallate components, whereas the simple oxides of the metals may not be suitable, because they do not form soluble alkali metal metallates. A few among the complex ionogens may be mentioned:—ammonia, hydrocyanic acid, sulfocyanic acid, oxalic acid, formic acid, tartaric acid, citric acid, glycerine and various types of sugars.

Certain compounds such as for example, vanadates, molybdates, tungstates, tanalates and uranates, which are not ordinarily considered as metallates, but which are capable of forming base exchange bodies with soluble silicates and metal salts, are intended to be included under the term "metallates" as used in the present invention. I therefore include under this term any alkali metal compound of a metal acid which is capable of forming with soluble silicates and metal salts base exchange bodies, or which can be rendered capable of so reacting by a change of valence which can be effected during the reaction. Thus for example, certain alkali permanganates which are incapable of forming base exchange bodies containing heptavalent manganese may be caused to react with soluble silicates and metal salts in the presence of suitable reducing agents which reduce the permanganate to a stage of oxidation in which it is capable of behaving as a metallate. Such compounds are included under the classification of metallates for the purposes of the present invention, and some very valuable products can be produced by the use of this type of compound. An example of an important element which may be so used is tetravalent vanadium.

The present invention may utilize a single metallate component, or a plurality of metallate components in any desired ratio may be used. The following elements are included among those forming metallates which can be used:—aluminum, chromium, zinc, vanadium, beryllium, tin, palladium, osmium, platinum, titanium, zirconium, lead, tungsten, boron, molybdenum, uranium and tantalum, copper, nickel, iron, cobalt, silver, cadmium, manganese, bismuth, thorium, and cerium.

The metal salt components are likewise numerous, and in general, any water-soluble, acid, neutral or basic salts or any mixtures may be used. The following elements are included among those which form suitable salts:—copper, silver, gold, beryllium, zinc, cadmium, aluminum, rare earths, titanium, zirconium, tin, lead, thorium, chromium, uranium, vanadium, manganese, iron, nickel and cobalt.

The silicate component may be an alkali metal silicate or other silicate which is soluble in alkali or part of the silicate component may be substituted in part by alkaline salts of the acids of the following elements:—boron, phosphorus, sulfur, nitrogen, tin, tellurium, selenium, arsenic and antimony. All of these compounds are capable of forming base exchange bodies with the other components, and are therefore to be considered the equivalent of the silicates.

The range of the new products used in the present invention is not limited to the elements present in the components which particularly form the non-exchangeable nucleus of the zeolite. On the contrary, it is possible to substitute the alkali metal ions by other metal cations by means of base exchange. Thus for example, one or more of the following cations may be introduced: ammonium, copper, silver, gold, beryllium, magnesium, calcium, zinc, strontium, cadmium, barium, aluminum, thallium, titanium, zirconium, tin, thorium, vanadium, chromium, uranium, manganese, iron, cobalt, nickel, palladium, and platinum. The elements or radicals may be introduced as simple or complex ions, or both, in any desired proportions. The introduction can be effected simultaneously or successively. The number of possible combinations by means of base exchange is of course very great, as will be readily apparent to a zeolite chemist. The number of new compounds is therefore greatly increased, and many valuable products, particularly catalysts or activators, can be produced by the introduction of suitable base exchange ions, which may increase the concentration of catalysts or activators in the product, or may result in a more finely tuned catalyst. The increase in catalytic activity which is frequently possible by a suitable introduction of the desired cations by base exchange frequently increases the permissible loading of the product in organic oxidations and may increase resistance to high temperatures, the percentage yield which can be obtained thereby, or the output, or both.

A further series of catalysts can be obtained by treating the base exchange bodies of the present invention with compounds containing suitable acid radicals which form with the base exchange bodies salt-like bodies. While these products behave in many ways as if they were actual salts, the exact chemical constitution of the products is not definitely known, and the invention is not intended to be limited by any theory as to compositions.

For the purposes of the present invention, acids or salts of the following elements may be used in order to produce salt-like bodies: vanadium, tungsten, uranium, chromium, molybdenum, manganese, selenium, tellurium, arsenic, phosphorus, sulfur, chlorine, bromine, fluorine, nitrogen and boron. Simple acids or their salts can be utilized, or polyacids, peracids and complex ions may be substituted wherever this is desirable. Other complex anions, such as ferro or ferricyanogen, sulfocyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid neutral or basic acid derivatives can be produced.

The diluted zeolites which I have found to be the most effective catalysts or contact masses for the process of the present invention can be prepared in a number of ways by the incorporation of a large variety of diluents, such as for example, highly porous diluents, as kieselguhr, glaucosil, "Celite" brick refuse, silicates, inactive zeolites, pumice meal, and other products, or they may be coated onto natural and artificial massive carrier fragments. The method of incorporating, and nature of diluents which are to be used, has been described in detail in the patent of Alphons O. Jaeger and Johann A. Bertsch, No. 1,701,075, dated February 5, 1929, where the incorporation of diluents in two component zeolites is described. While the present products are chemically quite different from zeolites which are prepared from two components, the methods of precipitation are analogous. I have found, therefore, that in most cases the same methods of incorporating diluents which have been described in the prior application, above referred to, in connection with two component zeolites, may be advantageously used for the incorporation of diluents in base exchange bodies used in the present invention. As described in the prior application, the diluents may be incorporated into the physical structure of the base exchange bodies, or the base exchange bodies can be formed in the interstices of relatively coarser diluents. Specific methods of incorporating diluents with base exchange bodies of the present invention will also be described in many of the specific examples which are to follow, it being understood of course that the invention is in no sense limited to the details of the examples which are illustrative modifications only.

The precipitation of the base exchange bodies is frequently slow, and sometimes incomplete, and it is often desirable to accelerate or complete the precipitation by heating, vigorous stirring, or by the addition of acids, either organic or inorganic, in liquid or gaseous form. Thus for example, hydrochloric acid, sulfuric acid, carbonic acid, nitric acid, acetic acid, formic acid and the like, or their acid salts, may be used. Ammonium salts and salts of the alkalies as well as halogens, alcohols and other organic substances, are frequently advantageous in accelerating precipitation, and are included in the scope of the present invention. In some cases, it is advantageous to operate under pressure in autoclaves, and the present invention is therefore not limited in its broader aspects to operations under any particular pressure.

The important property of porosity of base exchange products of the present invention may in many cases be enhanced by the incorporation with the bodies, during formation, of products which are readily removable either by volatilization, combustion or by leaching, leaving behind additional pores, and thus still further contributing to the permeability of the framework of the base exchange products. The removable products to be used may be inorganic or organic, and include a wide number of products, but the choice of products will of course depend on the characteristics of the base exchange body.

The production of base exchange bodies usually results in a considerable percentage of soluble salts in the reaction mixture, and it is frequently desirable to wash out these salts and to dry the products preferably at moderate temperatures which may advantageously be below 100° C. Some of the products may contain too little alkali for the purposes for which they are to be used, or they may lack mechanical strength. These products may advantageously be washed or impregnated with a dilute waterglass solution, instead of with water, with a resulting silicification which considerably increases the mechanical strength of the product, and may also desirably affect its chemical constitution, particularly by changing its alkalinity or acidity.

I find that it is often advantageous to subject the catalysts and contact masses used in the present invention to a preliminary treatment, consisting, first, in a calcination in the presence of air or other gases as described in my Patent Nos. 1,678,626 and 1,678,627 issued July 24, 1928.

This preliminary treatment or the catalytic process itself, which takes place at high temperature, results in certain chemical changes in the catalyst or contact mass which are not well defined, and when the catalyst is referred to in the claim, it should be considered as of the time when it is freshly made, as is usual in catalytic chemical nomenclature.

Many of the organic oxidations which are included in the present invention, and particularly the oxidation of many aromatic compounds, require a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some reactions. Other catalytically active or activating substances which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular oxidation reaction may be considered, and act as stabilizer promoters. I do not claim in this application the use of stabilizer or stabilizer promoters in general, as these form the subject-matter of my Patent No. 1,709,853 dated April 23, 1929. The expressions "stabilizers" and "stabilizer promoters", when used in the present application, are to be understood as used in the sense in which they are defined in the aforementioned co-pending application. It should be understood that while many of the multi-component zeolite catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds are to be considered as stabilizer promoters.

The present invention is applicable to all types of catalytic, organic oxidations. Among some of the most important reactions in which the present process can be used are the following:—The oxidation of benzol, toluol, phenol, tar phenols or furfural to maleic acid and fumaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone and diphenic acid; acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like. Mixtures of organic compounds such as for example coal tar fractions, may also be oxidized to mixtures of valuable oxidation products.

In addition to the above reactions and other similar reactions in which the desired products are the products of oxidation, the catalysts used in the present invention are important in such oxidation reactions in which an undesired impurity is burned out or transformed into a product easily separable from the main compound present, such as for example the catalytic purification of crude naphthalene, crude anthracene, coal tar ammonia and the like, with selective oxidation of some or all impurities and in reactions in which impurities are burned out and at the same time certain organic compounds are oxidized into products which it is desired to obtain, such as for example, the direct production of anthraquinone from crude anthracene especially with concomitant total combustion of carbazole, phenanthrene and other impurities. In fact processes of the present invention are applicable to any organic oxidation.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular reaction in which he is interested.

*Example 1.*

16 parts of vanadic acid are formed into a slurry with 300 parts of water and are acidified with sulfuric acid. The mixture is then heated to boiling and a rapid stream of sulfur dioxide is passed through the hot solution. In a short time, a blue solution of vanadyl sulfate is formed. After boiling out the excess sulfur dioxide, the blue solution is divided into two portions in the ratio of 2:3. ⅗ths of the blue solution are cautiously treated with a concentrated caustic potash solution until a clear brown solution of potassium vanadite is formed. 140 parts of potassium waterglass of 39° Bé. are diluted with 500 parts of water and the potassium vanadite is poured in with vigorous stirring. The mixture is then gently warmed and the remaining ⅖ths of the vanadyl sulfate is added in a thin stream with vigorous agitation, whereupon the mass first solidifies to a grey-green gel and on further stirring is transformed into readily filterable granular aggregates.

The amount of alkali used in the solutions should be so chosen so that at the end of the reaction the mixture remains weakly alkaline or neutral to phenolphthalein. If the alkalinity of the reaction mixture is much greater, the precipitation is delayed but can be accelerated by the addition of about 50 parts of a saturated potassium sulfate solution which by its salting out effect, improves the yield.

Another method of accelerating precipitation is to reduce the alkalinity of the reaction mixture by cautious addition of dilute acids or solutions of acid salts, such as for example, hydrochloric acid, sulfuric acid, potassium bisulfate, and the like. By this means any desired degree of alkalinity or neutrality of the resulting reaction product can be easily obtained.

The reaction mixture is allowed to stand and is then decanted, pressed and washed with water. The press-cake is dried preferably below 100° C and the three component base exchange body containing $SiO_2$ and $V_2O_4$ is then broken into fragments or is hydrated with water in which case it also breaks into granules. The final product is a light gray, hard body having conchoidal fracture and possesses base exchange properties.

The base exchange body may be heated for a considerable period of time at 400–500° C. in a stream of diluted burner gases. After this treatment the contact mass is very effective for the catalytic oxidation of organic compounds, particularly aromatic hydrocarbons such as the catalytic oxidation of benzol, toluol, napthalene, phenol, tar phenols to maleic acid whereby these aromatic compounds or mixtures together with air in the ratio of 1:30 are passed over the contact mass at 380 to 450° C.

If it is desired to dilute the base exchange body one or more of the three initial component solutions preferably, either the waterglass or the potassium vanadite solution, are mixed with a total of from 60–80 parts of "Celite" brick refuse, the resulting product being a diluted base exchange body which can be dehydrated by a stream of hot air and carbon dioxide and, which after preliminary treatment with acid gases such as hydrochloric acid, nitric acid, or sulfuric acid, is an excellent contact mass for the catalytic oxidation of naphthalene to phthalic anhydride when naphthalene vapors, mixed with air, in the ratio of 1:18 are passed over the contact mass at 370 to 420° C.

The concentrated or the diluted base exchange body may be treated by causing a 3–5% solution of heavy metal salts such as, silver nitrate, aluminum sulfate, copper sulfate or copper nitrate solutions or mixtures of them to trickle over it in order to effect base exchange. The products obtained are excellent contact masses, especially those which contain copper and silver as exchangeable bases for the catalytic oxidation of methyl alcohol and methane to formaldehyde.

*Example 2.*

Three mixtures are prepared as follows:
1. 210 to 250 parts of potassium or sodium waterglass solution of 33° Bé. diluted with 15 to 20 volumes of water are mixed with kieselguhr or other material rich in $SiO_2$ such as glaucosil, the acid treated residue of greensand, until a suspension is obtained which is just stirrable.

2. 18 parts of $V_2O_5$ are dissolved in just sufficient 10–20% caustic potash or caustic soda solution so that potassium or sodium vanadate is obtained.

3. 18 parts of $V_2O_5$ are reduced with sulfur dioxide in aqueous suspension in the usual way to form the blue vanadyl sulfate, about 200 to 300 parts of water being needed. The excess $SO_2$ is removed by boiling.

Mixtures 1 and 2 are poured together and Solution #3 is permitted to flow in with vigorous agitation, care being taken that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non exchangeable form and having materials rich in $SiO_2$ finely distributed throughout its framework.

After calcination the contact mass is well suited for the catalytic oxidation of crude anthracene directly to high grade anthraquinone when 45 to 50 per cent anthracene is uniformly vaporized with air in the ratio of 1:25 and passed over the catalyst at 380 to 450° C.

When the contact mass, before use, is treated at 400 to 500° C. with about 3% burner gases the product obtained becomes an excellent contact mass for the catalytic oxidation of naphthalene to alphanaphthaquinone, phthalic anhydride and maleic acid under suitable conditions for each of these reaction products. Among these conditions may be mentioned temperature at which the catalytic oxidation of naphthalene is carried out, the time of the reaction, mixture of naphthalene and air, the proportion of the catalyst to the reacting gases and the relative proportions of naphthalene and oxygen to the diluent gases such as carbon dioxide and nitrogen.

Naphthalene and air mixed in the ratio of 1:16 are passed over the contact mass at 380 to 420° C. and produce phthalic anhydride. Naphthalene and air mixed in the ratio of 1:40 when passed over the contact mass at 360 to 390° C. produce large amounts of alphanapthaquinone in addition to phthalic anhydride. When temperatures of 420 to 500° C. are used in the manufacture of phthalic anhydride, the phthalic anhydride contains considerable amounts of maleic acid.

A still further adjustment of the contact mass for the catalytic oxidation of organic compounds can be effected by exchanging part of the exchangeable alkali for other cations such as, for example, copper, silver, iron, cobalt, aluminum, titanium, manganese, cerium and nickel, using 3 to 6% solutions of these salts or their mixtures. Contact masses in which silver and copper or a mixture of both is introduced are efficient for the catalytic oxidation of methanol and methane to formaldehyde. Contact masses which contain aluminum, titanium and cerium or one of these elements in addition to silver and copper are well suited for the catalytic oxidation of toluol and the various halogen and nitro substituted toluols to the corresponding aldehydes and acids; xylene, pseudocumene, mesitylene, paracymene, or other derivatives to the corresponding aldehydes and acids.

Contact masses which contain iron and manganese or a mixture of both introduced by base exchange are excellently suitable for the catalytic oxidation of anthracene to anthraquinone, acenaphthene to naphthalic anhydride and hemimellitic acid.

A further improvement of these contact masses for several specific catalytic oxidation reactions can be effected by forming salt-like bodies of the three component base exchange body with acids of the elements of the 5th and 6th groups of the periodic system, especially vanadium, tungsten, and molybdenum. Such contact masses are suitable for the catalytic oxidation of benzol, tar phenols, and furfural to maleic acid and fumaric acid when mixtures of these organic compounds with air in the ratio of 1:15 are passed over the catalyst at 390 to 420° C.

The diluents rich in silica such as kieselguhr, which is stirred into the waterglass solution #1, may also advantageously be impregnated, before use, with 3 to 5% of iron oxide, nickel oxide, copper oxide, cobalt oxide or aluminum oxide in the usual way. Such contact masses containing these oxides embedded in the framework of the three component base exchange bodies are well suited for the catalytic purification of tar ammonia by the selective total combustion of the organic and inorganic impurities whereby the resulting ammonia is substantially free from any impurities. Tar ammonia mixed with air, the amount of air being chosen that a large excess of oxygen is available for the total combustion of organic substances and for the conversion of sulfur compounds to $SO_3$, is passed over the catalyst at 420 to 500° C.

The oxides of the metals introduced with the catalytically indifferent diluents act in this case as stabilizer promoters to the three component base exchange bodies which contain the catalytically effective components and stabilizers in chemical combination.

A further modified method of preparing highly efficient contact masses consists in introducing in the diluents, before use, vanadates, moylbdates, tungstates, chromates or tantalates, especially of the heavy metals. For this purpose the diluents may be impregnated with 3 to 5% of such metallates in the usual way whereby very effective catalysts for the catalytic oxidations of many of the aforesaid hydrocarbons are obtained.

*Example 3.*

Three mixtures are prepared as follows:
1. 210 parts of potassium waterglass solution of about 33° Bé. diluted with 6-8 volumes of water are mixed with a mixture of comminuted silicates and kieselguhr until the suspension remains easily stirrable. The mixed diluent of silicates and kieselguhr contains preferably more than 25% of kieselguhr. The limits for the addition of the amount of diluents can be chosen throughout large range without affecting the catalytic efficiency of the final product to any bad extent.

2. 18 parts of $V_2O_5$ are reduced in a hot aqueous solution acidified with $H_2SO_4$ to a blue vanadyl sulfate solution by means of sulfur dioxide and the vanadyl sulfate obtained is transformed into a brown solution of potassium vanadite by treatment with sufficient 10 N. caustic potash solution in the usual way.

3. A sufficient amount of 10% aluminum sulfate solution is prepared.

Suspension 1 and solution 2 are poured together and a sufficient amount of the aluminum sulfate solution is added in a thin stream with vigorous agitation to bring the reaction mixture to neutrality to phenolphthalein or to a point which is just on the alkaline side. The mass solidifies to a dirty green gel which is filtered with suction, lightly washed and dried, constituting a diluted base exchange body which contains tetravalent vanadium, aluminum and $SiO_2$ in non-exchangeable form.

The diluents can also be suspended in the solution 2 or in the mixture of the suspension 1 and solution 2 with the same result.

Solution 2 can be substituted in part or in whole by a corresponding amount of potassium vanadate solution dissolving the $V_2O_5$, without reduction, directly in 2 N. potassium hydroxide. In this case a gel is produced which contains $V_2O_4$ and $V_2O_5$, $Al_2O_3$ and $SiO_2$ corresponding to the three classes of components used in the initial solutions.

The solution 3 can also be substituted in part or in whole by other metal salt solutions, such as, for example, copper sulfate, nickel sulfate, cobalt sulfate, iron sulfate, manganese nitrate, ferric chloride and the like, singly and in admixture.

The bodies can also be changed after drying, preferably at 100° C., by base exchange or by the formation of salt-like bodies, whereby the broken base exchange body is first hydrated by trickling water over it.

Contact masses in which no elements are introduced by base exchange and no salt-like bodies are formed are well suited for the catalytic oxidation of phenanthrene to phenanthraquinone and diphenic acid, fluorene to fluorenone, or anthracene to anthraquinone, in which case 30 to 40% crude anthracene can be used as a raw material under reaction conditions similar to those described in foregoing examples.

Such base exchange bodies when transformed to salt-like bodies by spraying a diluted $H_2SO_4$ and $HNO_3$ over the mass or by heating the mass to 420 to 500° C. and passing 3 to 5% burner gases over it, are very efficient contact masses for the catalytic oxidation of naphthalene to phthalic anhydride when naphthalene and air mixed in the ratios of from 1:16 to 1:30 are passed over the contact mass at 370–420° C. The yields of phthalic anhydride are between 85–88% of the theory.

Example 4.

1. A solution containing 48 to 96 parts of $SiO_2$ in the form of ordinary potassium waterglass solution of 33 to 36° Bé. is diluted with 10 to 12 times its volume of water and sufficient 20% ammonia water is then added until the cloudiness which has formed is cleared up.

2. 29 parts of $Cu(NO_3)_2 6H_2O$ are dissolved in water to form a $N/10$ solution and sufficient concentrated ammonia water is added until the precipitate which first forms again dissolves.

The deep blue copper solution is then poured into the first solution with vigorous stirring.

A sufficient amount of almunium nitrate solution containing about 10% $Al(NO_3)_3$ is prepared. This aluminum nitrate solution is then gradually added to the mixture of the waterglass and cuprammonium complex solution until the reaction mixture is just neutral to phenolphthalein.

The reaction product consists of a deep blue gel which is pressed and dried, thereby forming greenish blue fragments of conchoidal fracture which disintegrate into small pieces in hot water.

The cuprammonium complex in this example can also be replaced wholly or partly by other complex compounds such as nickel complexes.

The aluminum nitrate in this example can also be replaced partly or wholly by other metal salt solutions such as copper, nickel, iron, manganese, cobalt, silver, lead, singly or in admixture.

In many cases it is advantageous to introduce calcium by base exchange in these three component zeolites obtained, the potassium of the base exchanging part being partly replaced thereby. Before introducing calcium it is advantageous first to trickle water over the base exchange body for hydration purposes. All the bodies obtained by this method are more or less very effective catalysts for the selective purification of different grades of crude anthracene and high grade anthracene, whereby the carbazol content of these crude grades of anthracene is eliminated to a large extent, or entirely, by total combustion, and in some cases the phenanthrene content is also strongly attacked by total combustion so that the remaining anthracene contains, in most cases, small amounts of phenanthrene as the only impurity.

The anthracene thus purified can easily be further purified by well known methods e. g., by dissolving it in the minimum amount of solvent naphtha or other solvents which possess a solubility especially for phenanthrene at 80 to 100° C. The anthracene obtained from one recrystallization contains in many cases between 95 and 98% anthracene and is practically colorless. Such highly purified anthracene is very valuable especially in the dye-stuff industry.

Crude anthracene containing 30 to 35% anthracene uniformly vaporized with air in the ratio of about 1:20 and passed over such contact masses at 380 to 440° C. results in 70 to 80% anthracene containing practically no carbazol and the impurities which remain can be considered as phenanthrene. In the recrystallization of this product phenanthrene of a very high purity can be recovered from the solvent.

If high grades of anthracene are used in this process especially those which are freed to a large extent from phenanthrene but which contain large amounts of carbazol, 90 to 98% anthracene can be produced directly without recrystallization, by this catalytic process.

Instead of using these concentrated contact masses diluted catalysts with practically the same efficiency can be obtained by introducing kieselguhr, pumice meal, ground quartz, into the zeolite, especially during formation.

Contact masses coated onto artificial and natural carrier fragments such as pumice stones, quartz filter stones, in situ, or after formation of the zeolite with the help of alkali as binders are also effective catalysts for this process.

Instead of crude anthracene other aromatic hydrocarbons can be purified in the same way, especially crude naphthalene, using about the same reaction conditions as described with crude anthracene.

Example 5.

The following mixtures are prepared:
1. 250 parts of freshly precipitated iron oxide are suspended in water to form a very dilute suspension and are then treated with 15 parts of bismuth chloride with vigorous agitation. The hydrolysis of the bismuth chloride can be accelerated by the addition of ammonia. The basic bismuth oxide which is precipitated is absorbed by the iron oxide and potassium or sodium waterglass solution of about 33° Bé. containing 42 to 54 parts of $SiO_2$ together with a small amount of ammonia are added to the suspension.

2. 30 parts of cupric nitrate plus $6H_2O$ are dissolved in about 400 parts of water and then 20 to 25% ammonia is added until the dark blue cuprammonium compound is formed.

3. 40 parts of ferric nitrate containing 9 mols of water are dissolved in water to form about a 20% solution.

The suspension 1 and the solution 2 are mixed together and then solution 3 is added gradually with vigorous agitation precipitating out a product from the reaction mixture which should remain akaline.

After the gelatinous product has been washed and pressed it is given a subsequent washing with diluted potassium waterglass solution and then dried. For this purpose 1 part of a 33° Bé. potassium waterglass solution is dissolved in about 10 parts of water. After treatment the mass is dried and broken into fragments which are calcined with air at about 400° C. and then constitute an excellent contact mass for the catalytic purification of organic substances wherein especially nitrogen-containing organic substances are totally burned in the presence of an oxygen-containing gas such as air. Crude anthracene containing from 20 to 50% anthracene, carbazol in large amounts, and, in addition to phenanthrene, oily substances, is passed over the contact mass, after being uniformly vaporized with air in the ratio of 1:20 to 1:40 at 380 to 440° C. A 65 to 85% anthracene is obtained containing only phenanthrene as the principal impurity which later can easily be removed by one recrystallization with a minimum amount of solvent naptha at 80° C. The anthracene obtained after recrystallization shows a purity of 95 to 97% by the Höchst method.

*Example 6.*

Diluted and undiluted three component base exchange bodies and their salt-like bodies, as described in the foregoing examples, can be coated onto massive carrier fragments of natural and artificial origin such as, for example, materials rich in silica, e. g. quartz fragments, quartz filter stones, sand stones, fragments of silica gel, diatomaceous stones, "Celite" bricks, pumice fragments, fragments of natural or artificial silicates with or without base exchanging properties, especially zeolites diluted with materials rich in silica, unglazed porcelain fragments, metals such as aluminum granules, metal alloys such as ferro-silicon, ferro-vanadium, ferro-chrome, and the like, particularly when their surface has been roughened.

The coating of these carrier materials can take place either after formation of the product or the formation can be caused to take place on the carrier fragments, the alkaline reacting components, e. g., the waterglass and metallate solutions being first coated onto carrier fragments and then the metal salt component solution sprayed on them, whereby the three component zeolite, which is a good adhesive, is fixed on the carrier fragments. The coating process can also be carried out in the reverse order.

Very suitable types of artificial carrier fragments can also be prepared, for example, by forming fragments of "Celite", kieselguhr, pulverized quartz, pumice stones, silica gel, pulverized silicates and diluted or undiluted zeolites, using various adhesives such as waterglass, alkalies, or alkali metal salts followed by calcination preferably at 400 to 500° C. and if desired a treatment with inorganic acid such as sulfuric acid, nitric acid, phosphoric acid, hydrochloric acid and the like.

For the preparation of contact masses especially for the selective purification of crude anthracene by selective total combustion especially of carbazol, CaO, $Ca(OH)_2$, CaO-NaOH, or CaO-KOH can be used which are excellent adhesives and at the same time act as activators in this process.

Other initial materials for the preparation of artificial carrier fragments can be used, such as, alkali, waterglass, mixtures of alkalies with alkaline earths, greensand pretreated in various ways and then hydrated with water in order to improve its physical properties, especially its absorptive power which is very helpful in the catalytic oxidation of organic compounds.

A further voluminous carrier mass is produced by treating finely ground silica, such as, diatomaceous earth with lime in the presence of water with or without heat. Other oxides or hydroxides, such as strontium may be used instead of lime. The product is then dried and pulverized or the wet mass may be calcined and carbonated during or after calcination. By this process a considerable amount of hydrated calcium metasilicate is produced which is a very useful diluent for the preparation of such catalytically active diluted zeolites and also for the preparation of artificial carrier fragments useable in these processes.

The ratio of coating is about 1 kilo by weight of diluted or undiluted base exchange bodies to 10 liters of pulverized carrier fragments.

Instead of introducing diluent bodies into the three component base exchange bodies during formation as described in foregoing examples, the undiluted base exchange bodies, after preparation, while still in the wet form, can be mixed mechanically in aqueous suspension with the diluent bodies, or, the base exchange bodies may be dried and pulverized and then mixed with the latter. In most cases 50 to 100 parts of diluents are sufficient and the mixture can be formed into granules with any of the above described adhesives, especially alkali or waterglass.

The products thus produced are effective contact masses for the catalytic oxidation of many of the organic substances, as described in the foregoing examples under the reaction conditions there given.

*Example 7.*

12 parts of $V_2O_5$ are suspended in 300 parts of water to form a slurry, acidified with 3 to 6 parts of concentrated sulfuric acid and then reduced to the blue vanadyl sulfate by well known reducing means as, for example, by means of gases containing $SO_2$ which are passed in the solution at the boiling temperature.

108 parts of waterglass solution of 33° Bé. are diluted with 400 parts of water and about 80 to 100 parts of "Celite" brick refuse are stirred in.

The waterglass solution is then poured into the vanadyl sulfate solution with vigorous agitation precipitating out vanadyl silicate diluted with "Celite" brick refuse. Care should be taken that after all the solutions have reacted the resulting mixture must be neutral to litmus, which can be adjusted with the help of small amounts of N. sulfuric acid.

150 parts of potassium waterglass solution of 33° Bé. are diluted with 300 parts of water.

6 parts of $V_2O_5$ are transformed with the help of N. KOH solution to potassium metavanadate and the waterglass solution and vanadate solution are mixed together.

40 parts of $Al_2(SO_4)_3$ 18 aq. are dissolved in 250 parts of water.

To this latter solution the ground, diluted vanadyl silicate is added with vigorous agitation in order to bring it in a suspension, then the mixture of the two solutions of waterglass and vanadate are added in a thin stream with vigorous agitation.

The reaction mixture after the addition of the mixed solutions must be neutral or alkaline to phenolphthalein and the desired neutrality or alkalinity can easily be adjusted by using corresponding amounts of N. sulfuric acid with vigorous agitation. The reaction mixture is separated from the mother liquor in the usual way and washed with twice the amount of the mother liquor obtained, dried and broken in suitable pieces.

After calcining, for dehydrating purposes, the contact mass obtained can be used for the catalytic oxidation of 50 to 70% crude anthracene direct to anthraquinone, whereby the impurities such as carbazol and phenanthrene are substantially burned out.

In order to use this contact mass for the catalytic oxidation of naphthalene to alpha-naphthaquinone and phthalic anhydride it is preferable to treat the calcined contact mass with about 3% diluted $SO_2$-containing gases at 450 to 500° C., the $SO_2$ being transformed into $SO_3$ and the latter neutralizing the alkali content of the base exchange body.

Naphthalene mixed with air in the ratio of 1:20 is passed over this contact mass, and gives excellent yields of phthalic anhydride at 370 to 420° C. If the amount of air is largely increased, considerable amounts of alphanaphthaquinone are obtained in addition to phthalic anhydride.

Instead of using a potassium vanadate solution as the metallate component other catalytically active metallates, such as, tungstates and molybdates, may be used.

Instead of using an aluminum sulfate solution as the metal salt component other metal salts, such as those of iron, copper, silver, nickel, cadmium, titanium, zirconium and chromium may be used singly or in admixture, contact masses with specific efficiency for other oxidation reactions being produced.

In the cases in which tungstates or molybdates, or a mixture of them, are used instead of the vanadate, specifically effective contact masses are obtained. With such contact masses cresol can be oxidized to salicylaldehyde and salicylic acid, eugenol and isoeugenol to vanillin and vanillic acid, when these compounds, mixed with air in various ratios from 1:15 to 1:20, are passed over the contact mass at 360 to 400° C.

*Example 8.*

A mixture of 10 parts of $V_2O_5$ and 4 parts of $WO_3$ are dissolved in 300 parts of diluted KOH solution containing about 10.5 parts of 90% KOH. To this solution about 90 parts of "Celite" brick refuse or a mixture of comminuted quartz and diatomaceous earth equal in volume to the "Celite" brick refuse are added with vigorous agitation. Other diluents, as described in former examples, are also applicable, for example pumice.

The suspension is heated up to 80 or 90° C. and is gradually made faintly acid to congo, using 2 N. sulfuric acid in order to precipitate out $V_2O_5$ and $WO_3$, in this diluent, or, in the mixture of the diluents. The mixture obtained is then dried and ground.

40 parts of 33° Bé. potassium waterglass solution are weighed out.

2 parts of $Al_2O_3$ are transformed to the corresponding potassium aluminate in the usual way with the help of 5 N. potassium hydroxide solution.

The two solutions are then mixed together and, immediately after mixing, kneaded thoroughly with the $V_2O_5$ and $WO_3$ precipitate and then formed into suitable pieces. These formed pieces are then dried at temperatures under 100° C. preferably with gases containing $CO_2$, whereby a diluted three component base exchange body is obtained containing $V_2O_5$, $WO_3$, $Al_2O_3$ and $SiO_2$ in non-exchangeable form. The contact mass so obtained is calcined with 3 to 6% $SO_2$ gases containing a sufficient amount of oxygen, first at room temperature and then at 450 to 500° C.

This contact mass is well suited for the catalytic oxidation of naphthalene to phthalic anhydride, when naphthalene vapors and air at various ratios, such as, 1:18 by weight, are passed over the catalyst at 380 to 400° C. whereby high percentage yields of phthalic anhydride are obtained. Instead of using $V_2O_5$ and $WO_3$ other catalytically effective components such as those containing metal elements of the 5th and 6th groups of the periodic system may be used in the same way to produce analogous products. Examples of such components are $V_2O_4$, $MoO_3$ $Ta_2O_5$ and $WO_3$, and they may be used singly or in admixture, with or without $V_2O_5$ and $WO_3$.

Instead of using potassium aluminate other metallates of elements with amphoteric properties can be used, such as cadmium, beryllium, and zinc.

In many cases it is also advantageous to embed stabilized promoters such as, 5% $Fe_2O_3$, $TiO_2$ or $MnO_2$ in situ. Contact masses containing iron and manganese as stabilizer promoters are well fitted for the catalytic oxidation of anthracene to anthraquinone and where using 90% anthracene uniformly vaporized with air in different ratios, e. g. 1:40, passed over the contact mass at 360 to 380° C. excellent yields of anthraquinone are obtained.

*Example 9.*

1. 6.6 parts of $Al_2O_3$, freshly precipitated, are dissolved in N. KOH solution in order to form the corresponding potassium aluminate. To this solution are added diluents rich in $SiO_2$ such as comminuted silicates, quartz, ground rocks, tuffs, lava of volcanic or eruptive origin, artificial and natural zeolites, kieselguhr, "Celite" brick refuse. In using "Celite" brick refuse or kieselguhr 80 to 100 parts are the proper amount in order to prepare the diluted three component zeolite.

Diluents of advantageous character can also be prepared by special means. Thus for example, diluents containing $SiO_2$ may consist of colloidal $SiO_2$ or the product from the treatment of natural or artificial base exchanging silicates with dilute mineral acids, which treatment removes both the exchangeable alkali metals and the amphoteric metal oxide and leaves an $SiO_2$ complex of highly absorptive physical structure. The silicious diluents thus prepared when mixed with "Celite" brick refuse or kisselguhr are of great value in the preparation of three-component zeolite contact masses to be used in the catalytic oxidation of organic compounds.

In some cases it is also advantageous to add 5 to 10% of specially prepared silicates which act in this process as stabilizer promoters. Such silicates are an intermediate step in the preparation of the complex $SiO_2$ from artificial and natural base exchanging silicates. Base exchanging silicates such as leucite or artificial zeolites as commonly prepared are leached out with diluted mineral acids such as 5 to 10% sulfuric acid, hydrochloric acid or nitric acid, in order to remove the alkali from the exchangeable part of the base exchange body, leaving the amphoteric metal oxide in chemical combination with the $SiO_2$ group. Such silicates have a very high absorptive power and are excellent means for tuning the stabilizer action of the stabilizers in complex combination with the catalytically active portions of the contact masses.

2. 80 parts of potassium waterglass solution with an approximate strength of 33° Bé. are dissolved in 100 parts of water.

3. 24 parts of $Al_2(SO_4)_3$ plus 18 aq. are dissolved in 150 parts of water.

The aluminate suspension 1 is quickly mixed with the waterglass solution with strong agitation and the aluminum sulfate solution is added in a thin stream whereby a diluted gelatinous three component base exchange body is obtained which contains $Al_2O_3$ and $SiO_2$ in the non-exchangeable part. The mother liquor of the base exchange body is removed in the usual way, the presscake obtained dried preferably below 100° C., and then the dried body is broken in suitable pieces. In order to increase the yield small amounts of very dilute $H_2SO_4$ (5%) may be used whereby care must be taken that the reaction product and the mother liquor remain substantially neutral or weakly alkaline to phenolphthalein.

In this base exchange body the silicate and metallate components predominate over the metal salts component so that the resulting product resembles an alumino-silicate type of zeolite.

Using the same amount of components, another type of three component zeolite can be obtained when the order in which the three classes of components are reacting together, is changed. In this case the alkaline reacting components, the aluminate and waterglass solution are poured in the aluminum sulphate solution in which case the diluents may be present in the mixture of the alkaline components or in the metal salt component. The gelatinous mass obtained is worked up in the same way as before and dried.

The metal salt component and metallate component may first act together, the diluent body being preferably in one of these two components, and then the $SiO_2$ component is added.

These methods show the many possible modifications for the preparation of certain types of three component base exchange bodies.

Instead of changing the order in which the three classes of components react together, the amount of the components may be changed whereby other types of three component zeolites are obtained.

This is the case when the following percentage amount of the components are used:

1. 3.4 parts of $Al_2O_3$, freshly precipitated, are dissolved in N. KOH solution in order to form the potassium aluminate solution as the metallate component.

2. 120 to 150 parts of potassium waterglass of 33° Bé. are dissolved in about 200 parts of water.

3. 44.5 parts of $Al_2(SO_4)_3$ plus 18 aq. are dissolved in about 200 parts of water.

The diluent is added to one or the other or to the mixture of the alkaline reacting components.

A special method for the preparation of these three component zeolites consists of mixing the aluminate and $SiO_2$ component together and then adding the aluminum sulfate component. This procedure can also be carried out in the reverse order.

The reaction product obtained is worked up in the usual way and in this case the metal salt and silicate components predominate over the metallate component resulting in a three component zeolite which has certain resemblances to an aluminum double silicate type of zeolite.

The preparation of three component base exchange bodies in which the metallate and metal salt components predominate over the silicate component and producing a product which resembles a non-siliceous base exchange body, is carried out as follows:

1. 5 parts of $Al_2O_3$, freshly precipitated, are dissolved in N. KOH solution in order to form the corresponding potassium aluminate.

2. 34 parts of $Al_2(SO_4)_3$ plus 18 aq. are dissolved in 200 parts of water.

3. 50 parts of potassium waterglass solution of 33° Bé. are dissolved in 100 to 150 parts of water.

The above described diluents in the proper amount may be added to one of the components or to the mixture of the alkaline reacting components.

A base exchange body of this type with well developed base exchanging power is obtained when the aluminate and silicate components are mixed together and then the aluminum sulfate component is added with strong agitation. The reaction product obtained is freed from the mother liquor and dried in the usual way. Another further modification can be obtained when the components react in the reverse order.

Instead of using for the metallate component $Al_2O_3$ other components of this class may be used which contain vanadium, tungsten, molybdenum, lead, zinc or cadmium, with or without aluminum, singly or in admixture.

Instead of using aluminum sulfate other metal salts, with or without aluminum sulfate may be used singly or in admixture. Such salts may for example, contain vanadium, especially vanadyl sulfate, zinc, cadmium, titanium, zirconium, copper, nickel, cobalt, silver, beryllium, cerium, tin, thorium, manganese, chromium or iron.

By these methods base exchange bodies can be obtained which may or may not be catalytically active for the catalytic oxidation of organic processes depending on the components selected.

When the vanadium or other elements of the 5th and 6th groups of the periodic system, or their mixtures, are used, the base exchange body itself is catalytically active. When components are used which, in the combination in the base exchange body, are not catalytically active, the catalytically active component may be introduced by base exchange or by the formation of salt-like bodies, or by both, the catalytic power residing in both cases in chemical combination with or in the three component zeolite.

The catalytic power may reside wholly in the three component zeolite or in chemical combination therewith or it may reside partly in the zeolite and partly in diluents combined therewith to form mixtures preferably of physical homogeneous structures. Catalytically active diluents may also be associated with catalytically ineffective multi-component zeolites.

A diluted three component zeolite which contains aluminum and $SiO_2$ in the non-exchangeable part has no catalytic power for many catalytic oxidations of organic compounds to intermediate oxidation products, and, this body can be transformed into an efficient contact mass in several ways. The alkali metal in the exchangeable part of the base exchange body may be replaced partly or in the largest possible extent by other metals, especially the heavy metals, such as, iron, copper, nickel, cobalt, manganese, silver, also titanium, zirconium, aluminum, by trickling 5 to 10% solutions of the corresponding salts or their mixtures over it at ordinary temperatures or somewhat elevated temperatures in order to accelerate the base exchange. Before carrying out the base exchange it is advantageous in many cases to hydrate the base exchange body by trickling water over it. After this treatment the base exchange bodies are brought into reaction with ammonium vanadate or other soluble vanadates in order to form the vanadate of the base exchange body. The best method is to impregnate the base exchange body with the vanadate solution the alkali being washed out after reaction. The base exchange body changes its color to that of the corresponding vanadates. For this purpose a 1 to 10% solution of the vanadate may be used.

After drying, the contact mass so obtained may first be calcined at 400 to 500° C. with air, then with diluted burner gases containing about 3% $SO_2$. Toluol and the various halogen and nitro substituted toluols are transformed to the corresponding aldehydes and acids, and xylenes, pseudocumene, mesitylene, paracymene and other derivatives to the corresponding aldehydes and acids, when these compounds, mixed with air in various ratios, such as, 1:40, are passed over the contact mass at 340 to 420° C.

In many cases it is also advantageous to introduce the catalytically active component or components into the exchangeable part of the three component zeolite, particularly by using about a 3 to 5% vanadyl sulfate in order to replace a maximum alkali metal by the vanadyl radical. After this procedure a salt-like body may be formed using therefor vanadates, tungstates, molybdates, or their mixtures in 3 to 5% solutions. This results in increasing the concentration of the catalytically active components which are in chemical combination with the three component zeolite. Such contact masses are also well suited for the catalytic oxidation of aromatic hydrocarbons to valuable intermediate oxidation products.

A very efficient contact mass for such purposes may also be prepared by introducing catalytically active diluents such as, 5 to 10% of the metallates of the 5th and 6th group of the periodic system, especially silver vanadate, copper vanadate, maganese vanadate, iron vanadate, the corresponding tungstates, molybdates, uranates, tantalates, and their mixtures, in which case specific catalytic power may reside, partly or entirely, in the diluents.

A further improvement in these contact masses can be obtained when, in addition to the diluents described above, so-called stabilizer promoters are added, which particularly tune the stabilizer action of the alkali in the exchangeable part of the three component zeolite. In many cases 2 to 5% of such stabilizer promoters are sufficient. $Fe_2O_3$, $TiO_2$ or silicates especially of the heavy metals possess excellent stabilizer promoter properties for many catalytic oxidations of organic compounds in which they themselves are not highly effective catalysts.

The modifications described in this example show that many highly effective catalysts for the catalytic oxidation of organic compounds can be prepared according to the present invention, all the specific features in the properties of such contact masses which are necessary for successful operation being fully taken into account.

*Example 10.*

1. 20 parts of $V_2O_5$ are dissolved in 150 to 200 parts of water containing about 17 parts of 90% KOH.
2. 6 parts of $CuSO_5$ 5 aq. are dissolved in 150 to 200 parts of water and concentrated ammonia solution is added until a clear blue solution of cuprammonium complex is obtained.
3. 2 parts of freshly precipitated $Al_2O_3$ are dissolved in the corresponding amount of 2 N. KOH solution in order to form potassium aluminate.
4. 80 parts of potassium waterglass of 33° Bé. are diluted with twice the amount of water and a 10% ammonia solution is added until the cloudy precipitate first obtained is again dissolved.
5. 42 parts of $Fe_2(SO_4)_3$ plus 9 aq. are dissolved in 200 parts of water.

The aluminate and cuprammonium complex solutions are poured together and 80 to 90 parts of unground infusorial earth are added in order to form a suspension of the diluent with the mixture. The mixture of the vanadate and waterglass solution are then added with vigorous agitation and the ferri-sulfate solution is poured in in a thin stream. The reaction mixture remains alkaline to phenolphthalein and can be adjusted to neutrality or slight alkalinity to phenolphthalein by adding N. $H_2SO_4$. The product so obtained is freed from the mother liquor by filtering and pressing and is washed out with about 300 parts of water in portions. The presscake is then dried at temperatures preferably below 100° C. and broken into small fragments. The three component zeolite obtained contains vanadium, copper, aluminum, iron, and $SiO_2$ in non-exchangeable form diluted with unground infusorial earth. Before use, this contact mass is calcined with air at 400° C. in order to dehydrate the mass.

After a preliminary treatment with diluted burner gases at about 450° the mass obtained is well suited for the catalytic oxidation of naphthalene to phthalic anhydride. Naphthalene vapors mixed with air in various ratios, such as 1:16 are passed over the contact mass at 380 to 400° C. whereby high percentage yields are obtained.

*Example 11.*

Quartz fragments about the size of a pea are treated with about 20% solution of hydrofluoric acid in order to roughen the surface of the quartz fragments. On these carrier fragments a three component base exchange body containing platinum is formed, the amount of coating preferably being about 10% of the volume of the carrier fragments.

Instead of forming the base exchange body in situ on the fragments the finished three component base exchange body may be pulverized and coated afterwards on the carrier fragments with the help of adhesive substances such as waterglass, $MgSO_4$, KOH, NaOH and the like.

The base exchange body is prepared in the following way:

1. 2 parts of $Al_2O_3$ are transformed into potassium aluminate using N. potassium hydroxide solution.
2. 40 parts of sodium waterglass solution of about 36° Bé. are diluted with five volumes of water.
3. 4 parts of $H_2PtCl_6$ are prepared in a 2 to 5% solution.
4. 15 parts of $Fe_2(SO_4)_3$ 9 aq. are dissolved in about 150 parts of water.

The solutions 1 and 2 are poured together and then the mixture of the solutions 3 and 4 is poured in with vigorous agitation, care being taken that the resulting three component base exchange body, containing aluminum $SiO_2$, iron and platinum in non-exchangeable form, remains alkaline to litmus or preferably neutral to phenolphthalein.

The base exchange body obtained is freed from the mother liquor by pressing, and then dried. Before using this material it may advantageously be hydrated by trickling water over it until the water which drains off does not contain appreciable amounts of salts.

Instead of using an undiluted base exchange body a diluted base exchange body may be prepared, particularly one using powdered quartz, silicates or other materials rich in silica, such as colloidal $SiO_2$, kieselguhr, and the like, as diluents. A contact mass prepared with such a multi-component diluted base exchange body is an effective contact mass for the catalytic purification of coal tar ammonia, crude naphthalene and the like, many of the impurities being selectively burned out during the reaction, as described in former examples.

*Example 12.*

Highly effective base exchange bodies for the catalytic oxidation of organic compounds may be obtained by the combination of diluted or undiluted three component zeolites with other diluted and undiluted base exchange bodies which may or may not contain $SiO_2$ in the nonexchangeable part.

Many different methods for the preparation of such contact mass combinations may be used. Thus the three component zeolites may be embedded in other base exchange bodies singly or in admixture with other base exchange bodies or vice versa.

The following description of such contact masses will illustrate the many possible contact mass combinations of high efficiency for the catalytic oxidation of organic compounds, especially aromatic compounds.

16 parts of vanadic acid are formed into a slurry with 300 parts of water and then acidified with sulfuric acid. The mixture is then heated to boiling and a vigorous stream of sulfur dioxide is passed through the hot solution. In a short time a blue solution of vanadyl sulfate is obtained. After boiling out the excess sulfur dioxide the blue solution can be divided into two portions in the ratio of 2:3.

1. 3/5 of the blue solution are cautiously treated with a concentrated caustic potash solution until a clear brown potassium vanadite solution is obtained.
2. 140 parts of potassium waterglass solution of about 36° Bé. are diluted with 500 parts of water.
3. The remaining 2/5 of the vanadyl sulfate solution constitutes the metal salt component for the preparation of the zeolite. The waterglass and potassium vanadite solutions are poured together and the vanadyl sulfate solution is added in a thin stream with vigorous agitation whereupon the mass first solidifies to a gray-green gel and by further stirring is transformed into readily filterable granular aggregates. Naturally care must be taken that the resulting mixture at least remains weakly alkaline or neutral to phenolphthalein, which can be adjusted by adding dilute $H_2SO_4$ about 5% until the proper alkalinity or neutrality is obtained. Thus the yield of the three component base exchange body can also be bettered by the addition of saturated alkali salts such as potassium sulfate or potassium bi-sulphate, whereby the latter also takes care of the excess of alkali in the preparation of such bodies.

The reaction mixture is allowed to stand, decanted, pressed and washed with water.

The presscake is dried and the three component base exchange body containing $SiO_2$ and $V_2O_4$ is then ground, or, preferably, before grinding the base exchange body may be hydrated by trickling water over it, and again dried.

Instead of this base exchange body the corresponding diluted base exchange body may be prepared, preferably using materials rich in $SiO_2$ such as kieselguhr as diluents. The base exchange body may be embedded in a two component zeolite or in a base exchange body which does not contain $SiO_2$ as one of the original initial components.

90 parts of 33° Bé. potassium waterglass solution are diluted with 4 to 5 volumes of water and the three component zeolite obtained, together with sufficient unground infusorial earth are added with vigorous stirring in order to obtain a uniform distribution of the diluents. When the diluted three component base exchange body is used in the preparation of this contact mass it is not necessary to add the infusorial earth to the waterglass solution as a further diluent.

60 parts of aluminum sulfate containing 18 mols of water are dissolved in 200 parts of water and sufficient 20% ammonia water is added in order to precipitate aluminum hydroxide. The aluminum hydroxide is then freed from the mother liquor, washed out and treated with sufficient 2 N. potassium hydroxide solution in order to prepare the corresponding aluminate solution. The aluminate solution is then stirred into the suspension of waterglass and the three component zeolite and the mixture is heated up to about 60° C. A gelatinous precipitate is obtained and is increased by the gradual addition of 2 N. sulfuric acid. In adding the sulfuric acid, care should be taken, however, that at least a weak alkalinity to phenolphthalein is maintained. The stirring is continued for about an hour, the mixture being gradually permitted to cool down to room temperature. The gelatinous precipitate obtained is pressed and washed with 200 parts of water in small portions and the filter cake is then dried and broken into fragments of suitable size.

In the preparation of this contact mass the two component zeolite may also contain catalytically active components.

Instead of using this two component zeolite a three component zeolite with or without specific catalytic efficiency for the catalytic oxidation of organic compounds may be used, especially as described in the foregoing examples. The process for the preparation of such contact masses may be carried out in the reverse order. The three component base exchange body may also be embedded in a base exchange body which is prepared in the following way:

12.2 parts of freshly precipitated aluminum oxide are brought into solution with 40 parts of 100% KOH in 200 parts of water. The three component base exchange body described above is then stirred into the solution and a 10% aqueous solution containing 37 parts of ferric sulfate with 18 mols of water or 44.4 parts of aluminum sulfate with 18 mols of water, or a mixture of the two, is added to the aluminate solution with vigorous agitation. The corresponding amount of titanium sulfate, zirconium sulfate and thorium nitrate may also be used.

The reaction product obtained, which is a non-silicious aluminum base exchange body and which does not possess catalytic properties for the catalytic oxidation of many organic compounds is diluted with the catalytically active three component base exchange body and the combination of the two constitutes a highly active contact mass for the catalytic oxidation of organic compounds.

In the preparation of this base exchange body in which the diluted three component zeolite is embedded, components which possess catalytically active properties may also be used.

The process may also be carried out in the reverse order, that is to say, the non-silicious base exchange body may be embedded in the three component zeolite.

All contact masses obtained may be treated with 5% solutions of the salts of the heavy metals as copper sulfate, iron sulfate, etc., in order to replace partly or to the largest possible extent the alkali of the base exchanging part of the zeolite molecules. In some cases, it may also be desirable to produce so-called salt-like bodies as described in preceding examples. The introduction of heavy metals in the base exchange part of the zeolite combinations and the formation of so-called salt-like bodies results very often in contact masses which are highly resistant to high temperatures very often obtained in the catalytic oxidation of organic compounds.

These contact masses are applicable to many of the catalytic oxidations described in the foregoing examples, and also for the catalytic oxidation of ethyl alcohol to acetic acid, ethylene chlorhydrine to chloracetic acid, etc., under reaction conditions similar to those described in the foregoing examples.

In the claims, the expression "multi-component zeolite body" will be used to cover multi-component zeolites and their salt-like body derivatives, it being understood, of course, that the expression is used to define the contact masses as of the time when they are freshly prepared.

What is claimed as new is:

1. A method of oxidizing organic compounds, which comprises subjecting them to reaction with an oxidizing agent in the presence of a catalyst which contains a catalytically active multi-component zeolite body.

2. A method of oxidizing organic compounds, which comprises passing the vapors of the compounds mixed with an oxidizing gas at an elevated temperature over a catalyst which contains a catalytically active multi-component zeolite body.

3. A method of oxidizing organic compounds, which comprises passing the vapors of the compounds mixed with an oxidizing gas at an elevated temperature over a catalyst which contains a catalytically active diluted multi-component zeolite body.

4. A method of oxidizing organic compounds, which comprises subjecting them to reaction for example with an oxidizing agent in the presence of a catalyst which contains a catalytically active multi-component zeolite body and a compound of an element included in the group alkali metals, alkaline earth metals, and earth metals whose oxides are not reducible by hydrogen.

5. A method of oxidizing organic compounds, which comprises subjecting them to reaction with an oxidizing agent in the presence of a catalyst which contains a diluted multi-component zeolite body, at least part of the catalytically active components being chemically combined with the zeolite.

6. A method of oxidizing organic compounds, which comprises subjecting them for example in the vapor phase to reaction with an oxidizing agent in the presence of a catalyst which contains a catalytically active diluted multi-component zeolite body, at least part of the catalytically active components being present in the diluent.

7. A method of oxidizing organic compounds, which comprises subjecting them to reaction with an oxidizing agent in the presence of a catalyst containing a multi-component zeolite body, at least part of the catalytically active components being vanadium compounds.

8. A method of oxidizing organic compounds, which comprises passing the vapors of the compounds mixed with an oxidizing gas at an elevated temperature over a catalyst which contains a multi-component zeolite base exchange body, at least one compound of an element included in the group alkali metals, alkaline earth metals, and earth metals whose oxides are not reducible by hydrogen and at least one chemical, solid, non-specific vapor phase catalyst.

9. A method of oxidizing aliphatic compounds, which comprises passing the vapors of the compounds mixed with an oxidizing gas at an elevated temperature over a contact mass which contains a multi-component zeolite base exchange body.

10. A method of oxidizing aliphatic compounds, which comprises passing the vapors of the compounds mixed with an oxidizing gas at an elevated temperature over a contact mass which contains a multi-component zeolite base exchange body and at least one compound of an element included in the group alkali metals, alkaline earth metals, and earth metals whose oxides are not reducible by hydrogen.

11. A method of oxidizing aliphatic compounds, which comprises passing the vapors of the compounds mixed with an oxidizing gas at an elevated temperature over a contact mass which contains a multi-component zeolite base exchange body and at least one chemical, solid, non-specific, vapor phase catalyst.

12. A method of oxidizing an aliphatic alcohol to a carbonyl compound, which comprises passing the vapors of the alcohol mixed with an oxidizing gas at an elevated temperature over a contact mass which contains a multi-component zeolite base exchange body.

13. A method of oxidizing an aliphatic alcohol to a carbonyl compound, which comprises passing the vapors of the alcohol mixed with an oxidizing gas at an elevated temperature over a contact mass which contains a multi-component zeolite base exchange body and at least one compound of an element included in the group alkali metals, alkaline earth metals, and earth metals whose oxides are not reducible by hydrogen.

14. A method of oxidizing an aliphatic alcohol to a carbonyl compound, which comprises passing the vapors of the alcohol mixed with an oxidizing gas at an elevated temperature over a contact mass which contains a multi-component zeolite base exchange body and at least one chemical, solid, non-specific, vapor phase catalyst.

15. A method of oxidizing an aliphatic alcohol to an aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid.

16. A method of oxidizing an aliphatic alcohol to an aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid, the contact mass containing a compound of an element included in the group alkali metals, alkaline earth metals, and earth metals whose oxides are not reducible by hydrogen.

17. A method of oxidizing an aliphatic alcohol to an aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid, the contact mass containing a compound of an element included in the group alkali metals, alkaline earth metals, and earth metals whose oxides are not reducible by hydrogen and at least one chemical, solid, non-specific, vapor phase catalyst.

18. A method of oxidizing a monohydric paraffin alcohol to a corresponding aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid.

19. A method of oxidizing a monohydric paraffin alcohol to a corresponding aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid, the contact mass containing a compound of an element included in the group alkali metals, alkaline earth metals, and earth metals whose oxides are not reducible by hydrogen.

20. A method of oxidizing a monohydric paraffin alcohol to a corresponding aldehyde, which comprises passing the vapors of the alcohol mixed with an oxidizing gas at an elevated temperature over a contact mass containing a multi-component zeolite base exchange body and having an activity insufficient to oxidize a major portion of the alcohol to the corresponding acid, the contact mass containing a compound of an element included in the group alkali metals, alkaline earth metals, and earth metals whose oxides are not reducible by hydrogen and at least one chemical, solid, non-specific, vapor phase catalyst.

21. A method of oxidizing methyl alcohol to formaldehyde, which comprises passing the vapors of methyl alcohol admixed with an oxidizing gas at an elevated temperature over a contact mass containing a multi-component zeolite base exchange body and being insufficiently active to oxidize a major portion of the alcohol to formic acid.

22. A method of oxidizing methyl alcohol to formaldehyde, which comprises passing the vapors of methyl alcohol admixed with an oxidizing gas at an elevated temperature over a contact mass containing a multi-component zeolite base exchange body and being insufficiently active to oxidize a major portion of the alcohol to formic acid, the contact mass also containing a compound of an element included in the group alkali metals, alkaline earth metals, and earth metals whose oxides are not reducible by hydrogen.

23. A method of oxidizing methyl alcohol to formaldehyde, which comprises passing the vapors of methyl alcohol admixed with an oxidizing gas at an elevated temperature over a contact mass containing a multi-component zeolite base exchange body and being insufficiently active to oxidize a major portion of the alcohol to formic acid, the contact mass also having a compound of an element included in the group alkali metals, akaline earth metals, and earth metals whose oxides are not reducible by hydrogen and at least one chemical, solid, non-specific, vapor phase catalyst.

Signed at Pittsburgh, Pa., this 30th day of July, 1927.

ALPHONS O. JAEGER.